(12) United States Patent
Miyamoto

(10) Patent No.: US 8,565,825 B2
(45) Date of Patent: Oct. 22, 2013

(54) CONTROLLER FOR SELECTING ANTENNA FOR MULTIPLE-INPUT/MULTIPLE-OUTPUT COMMUNICATION

(75) Inventor: Shoichi Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 12/476,635

(22) Filed: Jun. 2, 2009

(65) Prior Publication Data

US 2009/0239523 A1    Sep. 24, 2009

Related U.S. Application Data

(63) Continuation of application No. PCT/JP2006/324979, filed on Dec. 14, 2006.

(51) Int. Cl.
*H04M 1/38* (2006.01)
*H04W 4/00* (2009.01)
*H04W 24/00* (2009.01)
*H04J 3/06* (2006.01)

(52) U.S. Cl.
USPC ............... 455/562.1; 455/422.1; 455/423; 370/350

(58) Field of Classification Search
USPC .............. 455/277.2, 562.1, 69, 423; 370/312, 370/350
See application file for complete search history.

(56) References Cited

U.S. PATENT DOCUMENTS

| | | | |
|---|---|---|---|
| 5,574,983 A * | 11/1996 | Douzono et al. | 455/69 |
| 5,740,526 A * | 4/1998 | Bonta et al. | 455/277.2 |
| 6,980,833 B1 * | 12/2005 | Hiramatsu | 455/562.1 |
| 7,869,421 B2 * | 1/2011 | Rangan et al. | 370/350 |
| 2001/0041595 A1 | 11/2001 | Ikeda et al. | |
| 2003/0162519 A1 | 8/2003 | Smith et al. | |
| 2003/0235147 A1 | 12/2003 | Walton et al. | |
| 2004/0009755 A1 | 1/2004 | Yoshida | |
| 2005/0085195 A1 | 4/2005 | Tong et al. | |
| 2006/0079221 A1 * | 4/2006 | Grant et al. | 455/423 |
| 2006/0234777 A1 | 10/2006 | Vannithamby et al. | |
| 2009/0245153 A1 * | 10/2009 | Li et al. | 370/312 |

FOREIGN PATENT DOCUMENTS

| | | |
|---|---|---|
| EP | 1587338 A2 | 10/2005 |
| JP | 9501299 | 2/1997 |
| JP | 11341540 | 12/1999 |
| JP | 2001168778 | 6/2001 |
| JP | 2003338781 | 11/2003 |
| JP | 2005531219 | 10/2005 |

(Continued)

OTHER PUBLICATIONS

International Search Report dated Feb. 20, 2007.

(Continued)

*Primary Examiner* — James Wozniak
*Assistant Examiner* — Kuo Woo
(74) *Attorney, Agent, or Firm* — Smith, Gambrell & Russell, LLP

(57) ABSTRACT

A base station apparatus for performing radio communication with a mobile station in a cell having a plurality of sectors performs a MIMO transmission using an antenna selected from among the antennas provided in each of two sectors when the mobile station moves in the vicinity of the boundary between the sectors. A base station apparatus for performing the radio communication with a mobile station in a cell having no sector structure performs a MIMO transmission using two or more antennas selected from among the antennas when the mobile station moves.

7 Claims, 22 Drawing Sheets

(56) References Cited

FOREIGN PATENT DOCUMENTS

| | | |
|---|---|---|
| JP | 2005333443 | 12/2005 |
| WO | 2006101210 A1 | 9/2006 |
| WO | 2006113009 A1 | 10/2006 |

OTHER PUBLICATIONS

Japanese Office Action dated May 31, 2011 for application No. 2008-549169.

Japanese Notice of Rejection Ground dated Sep. 27, 2011 issued in 2008-549169.

Extended European Search Report dated Sep. 21, 2012, issued in corresponding European Patent Application No. 06834733.5—1246/2093918.

Extended European Search Report dated Aug. 21, 2013 for application No. 13166049.0-1855/2624474.

* cited by examiner

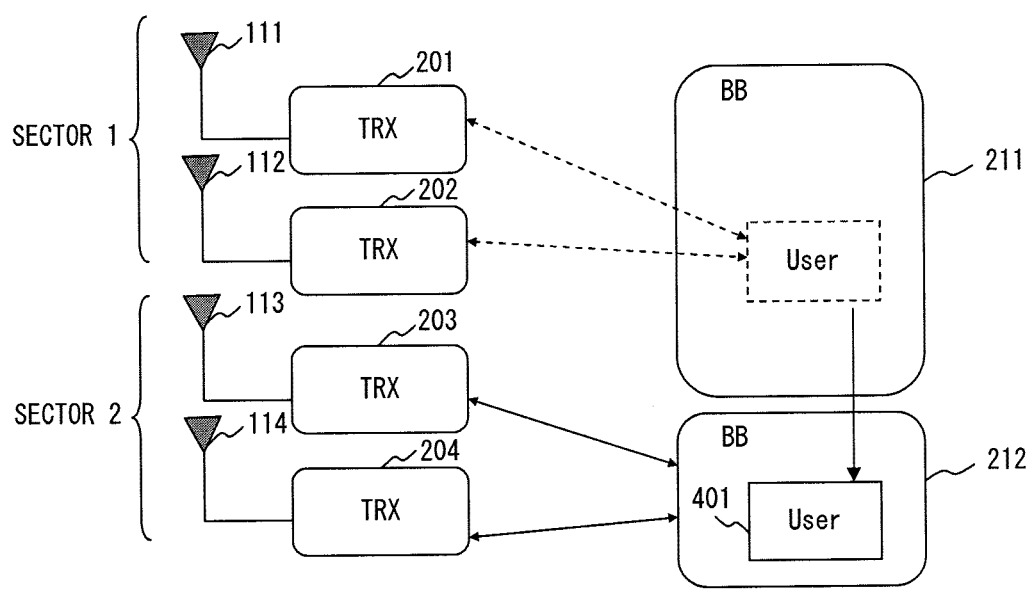
F I G. 6

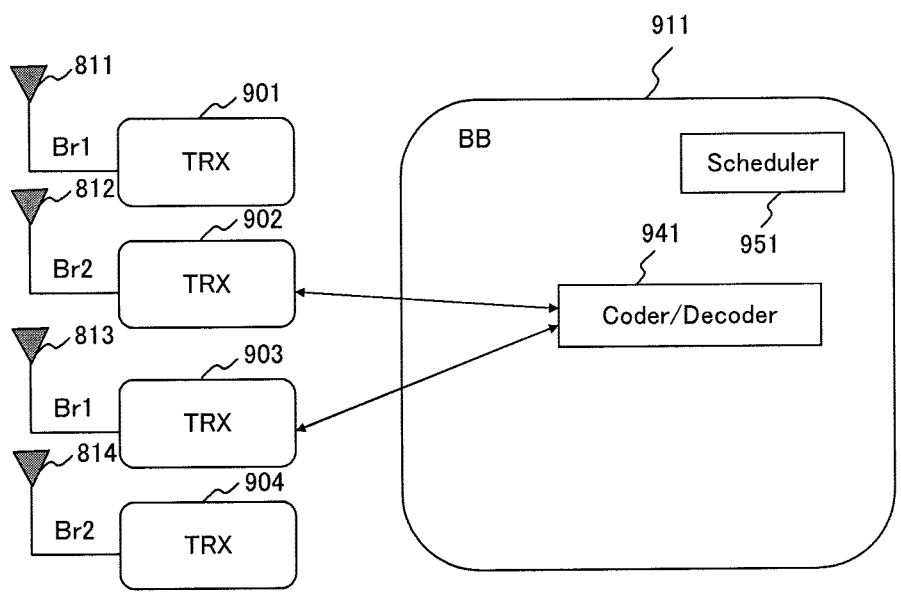
F I G. 1 2

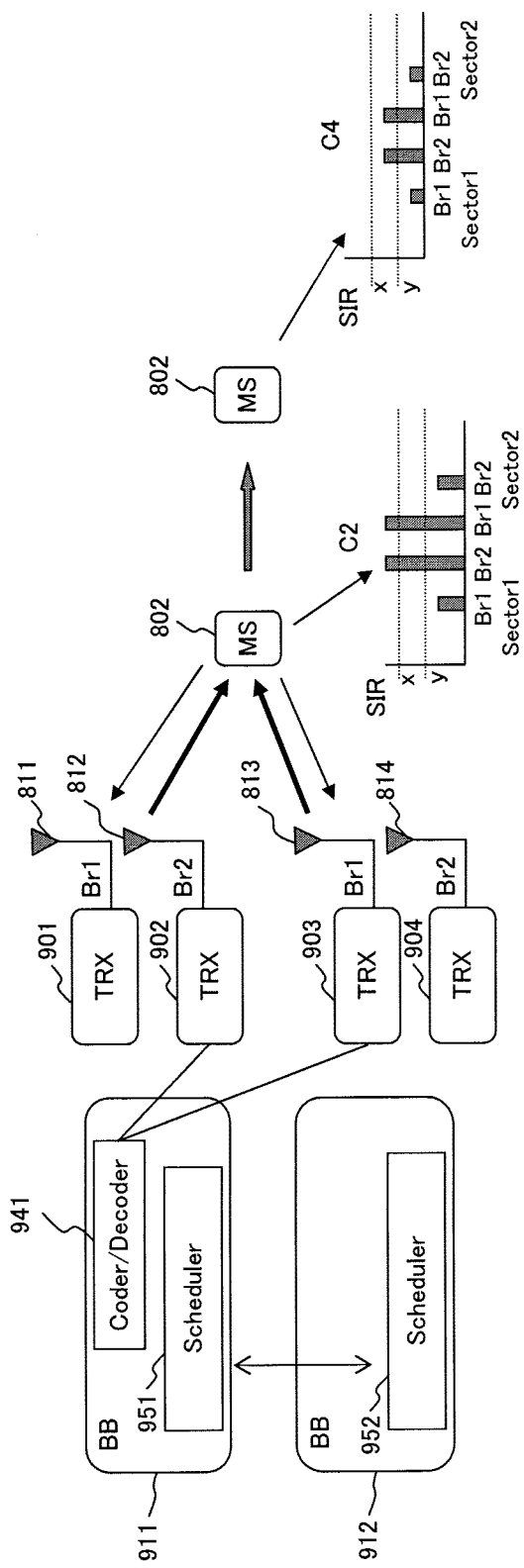
F I G. 14

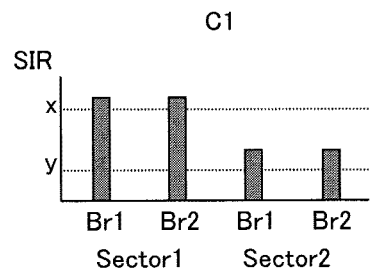
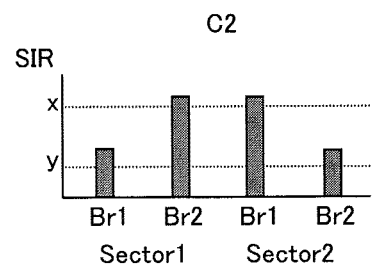
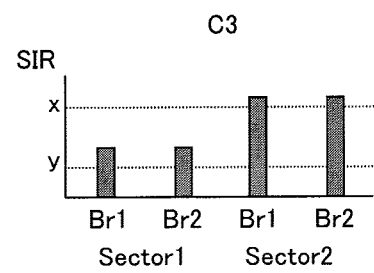
F I G. 1 6

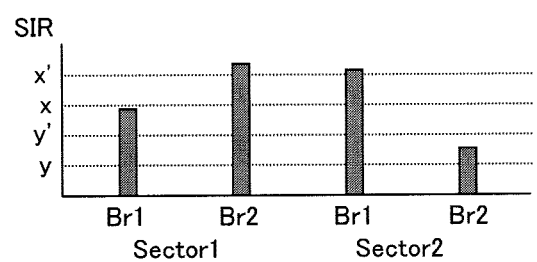
F I G. 17

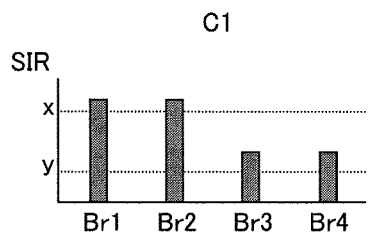
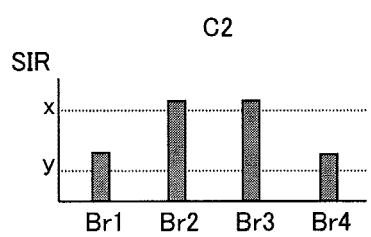
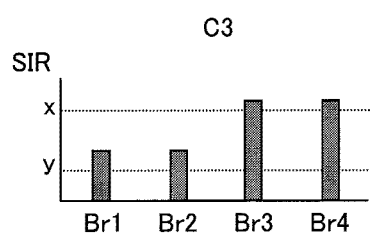
F I G. 2 2

CONTROLLER FOR SELECTING ANTENNA FOR MULTIPLE-INPUT/MULTIPLE-OUTPUT COMMUNICATION

CROSS-REFERENCE TO RELATED APPLICATIONS

This application is a continuation application of International PCT Application No. PCT/JP2006/324979 which was filed on Dec. 14, 2006.

FIELD

The present invention relates to a controller for selecting an antenna for use in a multiple-input/multiple-output communication (MIMO) transmission system for performing mobile radio communications using a plurality of antennas for transmissions and receptions.

BACKGROUND

A MIMO transmission is used to improve a transmission rate with limited frequency resources, and different pieces of data are transmitted from a plurality of correlated antennas, there by performing spatial multiplexing. Thus, a transmission rate can be improved without increasing the frequency bands. The MIMO technology is expected to be applied to a next-generation mobile radio communication system mainly for a high-speed data communication such as LTE (long term evolution), WiMax (worldwide interoperability for microwave access), etc.

FIG. 1 illustrates an example of the configuration of the conventional MIMO transmission system (2×2 MIMO). A cell 103 corresponding to a base station apparatus 101 is formed by three sectors 1 through 3, and the base station apparatus 101 has the configuration as illustrated in FIG. 2.

The base station apparatus illustrated in FIG. 2 includes antennas 111 through 116, transmission/reception units (TRXs) 201 through 206, baseband processing units (BBs) 211 through 213, and an interface (INT) 221. Among them, the transmission/reception units 201 through 206 and the baseband processing units 211 through 213 are connected to one another via a bus 231. In place of the bus 231, a mesh connection can be adopted. The interface 221 communicates with a base station control device through a cable transmission line.

Each branch of sectors 1 through 3 is configured by the following combination of an antenna and a transmission/reception unit.

1. branch Br1 of sector 1: antenna 111 and transmission/reception unit 201
2. branch Br2 of sector 1: antenna 112 and transmission/reception unit 202
3. branch Br1 of sector 2: antenna 113 and transmission/reception unit 203
4. branch Br2 of sector 2: antenna 114 and transmission/reception unit 204
5. branch Br1 of sector 3: antenna 115 and transmission/reception unit 205
6. branch Br2 of sector 3: antenna 116 and transmission/reception unit 206

Since the MIMO transmission can be performed in an area where a plurality of antennas can receive data, the following conditions are considered to prevent the MIMO transmission between the base station apparatus 101 and a mobile station 102 in the cell 103.

(1) Cell Edge

The correlation of antennas cannot be recognized when the mobile station 102 is apart from the base station apparatus 101.

(2) Sector Boundary

The MIMO transmission cannot be selected by handover when the mobile station 102 is approaching the boundary of sectors.

The mobile station 102 normally performs the MIMO transmission by selecting a plurality of antennas in good reception statuses. However, when the selected antennas belong to respective different sectors, the MIMO transmission is not selected, and a fast cell selection (FCS) or a soft handover (SHO) is selected because a control target in the conventional scheduling is assigned to a sector and the MIMO transmission over sectors is not defined.

For example, when the mobile station 102 is located around the center of the sector 1 the signal-to-interference ratios (SIRs) of the branches Br1 and Br2 of the sector 1 are sufficiently large as illustrated for the case C1 in FIG. 3, and the reception status is good. Therefore, a 2×2 MIMO transmission is performed using the antennas 111 and 112.

Next, when the mobile station 102 moves in the vicinity of the boundary between the sectors 1 and 2, the SIRs of the branch Br2 of the sector 1 and the branch Br1 of the sector 2 are large, but the SIRs of the branch Br1 of the sector 1 and the branch Br2 of the sector 2 are small as illustrated for the case C2. Therefore, it is hard to perform the 2×2 MIMO transmission, and the FCS or the SHO is normally applied.

Next, when the mobile station 102 moves in the vicinity of the center of the sector 2, the SIRs of the branches Br1 and Br2 of the sector 2 are large as illustrated for the case C3, and the 2×2 MIMO transmission is performed using the antennas 113 and 114.

Thus, when the mobile station 102 moves from the sector 1 to the sector 2, it is necessary to switch the connection of the user data by handover. As illustrated in FIG. 4, when the mobile station 102 exists in the sector 1, the baseband processing unit 211 is connected to the transmission/reception units 201 and 202, and the signal processing for the user data 401 is performed.

If the transmission/reception units 201 through 204 are connected to the baseband processing unit 211 through the bus 231 or a mesh as illustrated in FIG. 2, the connection is switched as illustrated in FIG. 5 when the mobile station 102 moves to the sector 2. In this case, the baseband processing unit 211 is connected to the transmission/reception units 203 and 204.

On the other hand, as designed for the HSDPA (high speed downlink packet access), if the baseband processing units 211 and 212 are respectively assigned to the sectors 1 and 2, and the mobile station 102 moves to the sector 2, then the user data 401 is moved to the baseband processing unit 212 as illustrated in FIG. 6. In this case, the baseband processing unit 212 is connected to the transmission/reception units 203 and 204.

While the mobile station 102 exists around the boundary of the sectors 1 and 2, the FCS is applied as illustrated in FIG. 7. In this case, the baseband processing unit 211 is connected to the transmission/reception units 201 through 204, and the same data is transmitted to the sectors 1 and 2.

As described above, while the mobile station 102 exists around the center of the sector 1 or 2, user data can be transmitted at a high speed in the 2×2 MIMO transmission. However, while the mobile station 102 exists around the boundary of the sectors 1 and 2, control is passed to the FCS/SHO. Therefore, the transmission rate is decreased, and the maximum transmission rate may not be attained.

The following patent document 1 relates to a communication system capable of switching selection diversity/MIMO transmission using a plurality of antennas, and the patent document 2 relates to a system of dividing base station antennas into a plurality of array groups and controlling a directional beam in each array group. The patent document 3 relates to a system of transmitting data in a multiple diversity transmission mode.

Patent Document 1: Japanese Laid-open Patent Publication No. 2005-333443

Patent Document 2: Japanese Laid-open Patent Publication No. 2003-338781

Patent Document 3: Japanese Translation of PCT International Application No. 2005-531219

SUMMARY

An object of the present invention is to improve average throughput in a cell of a mobile radio communication system by increasing the area where the MIMO transmission can be realized in the cell.

The first base station apparatus according to the present invention performs radio communications in a MIMO transmission with a mobile station in a cell having a plurality of sectors, and includes one or more antennas provided for each sector and a control unit. When a mobile station moves in the vicinity of the boundary of two sectors, the control unit selects an antenna from among the antennas provided for each of the sectors, and selects the MIMO transmission using the selected antennas.

With the above-mentioned configuration, the MIMO transmission can be performed at the boundary of sectors, and the area in a cell where the MIMO transmission can be performed increases. The control unit of the first base station apparatus corresponds to, for example, a scheduler 951 illustrated in FIG. 9 or a scheduler 1301 illustrated in FIG. 13.

The second base station apparatus according to the present invention performs radio communications in a MIMO transmission with a mobile station in a cell having no sector configuration, and includes a plurality of antennas provided corresponding to a cell and a control unit. The control unit selects two or more antennas from among the plurality of antennas when the mobile station moves, and selects the MIMO transmission using the selected antennas.

With the above-mentioned configuration, the MIMO transmission can be performed in any position in the cell, and the area in a cell where the MIMO transmission can be performed increases. The control unit of the second base station apparatus corresponds to, for example, a scheduler 1951 illustrated in FIG. 19 and described later.

BRIEF DESCRIPTION OF DRAWINGS

FIG. 6 illustrates the second handover;

FIG. 12 illustrates the second MIMO transmission;

FIG. 14 illustrates scheduling control;

FIG. 16 illustrates the relationship between the SIR and a threshold in the first MIMO transmission system;

FIG. 17 illustrates the arrangement of a threshold;

FIG. 22 illustrates the relationship between the SIR and a threshold in the second MIMO transmission system.

DESCRIPTION OF EMBODIMENTS

The best modes for embodying the present invention are described below in detail with reference to the attached drawings.

Figure 1:
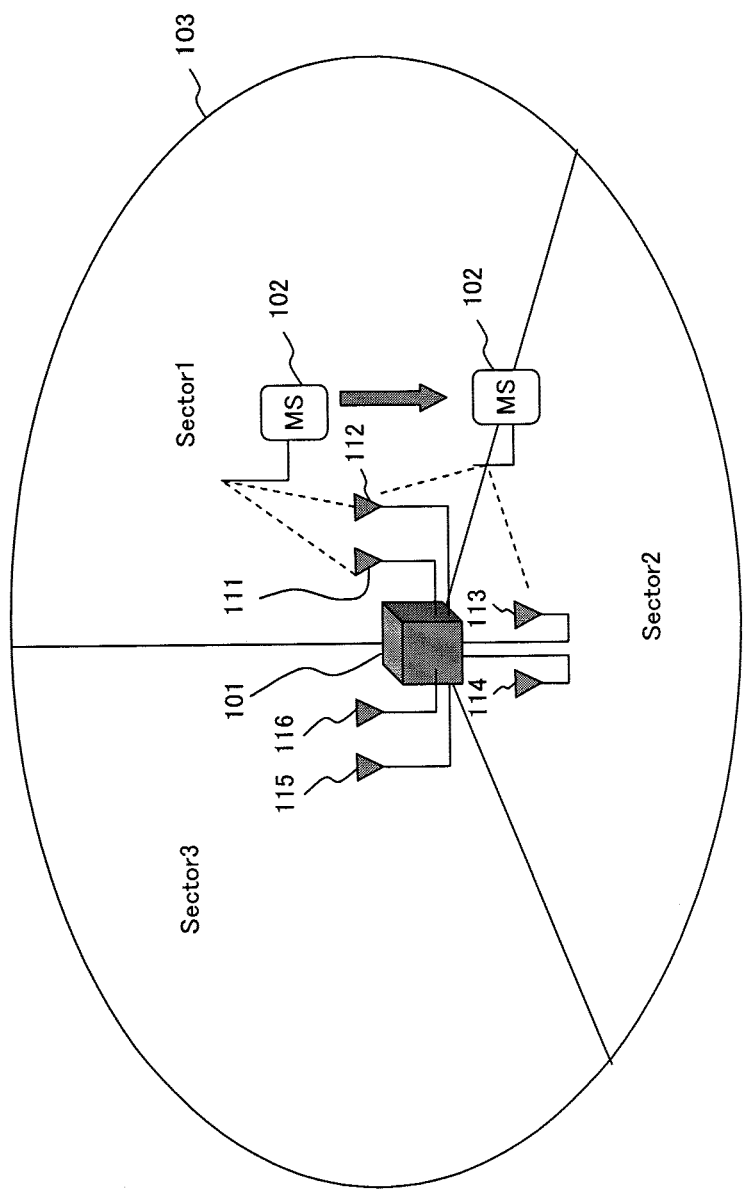
FIG. 1 illustrates the configuration of the conventional MIMO transmission system.
Figure 2:
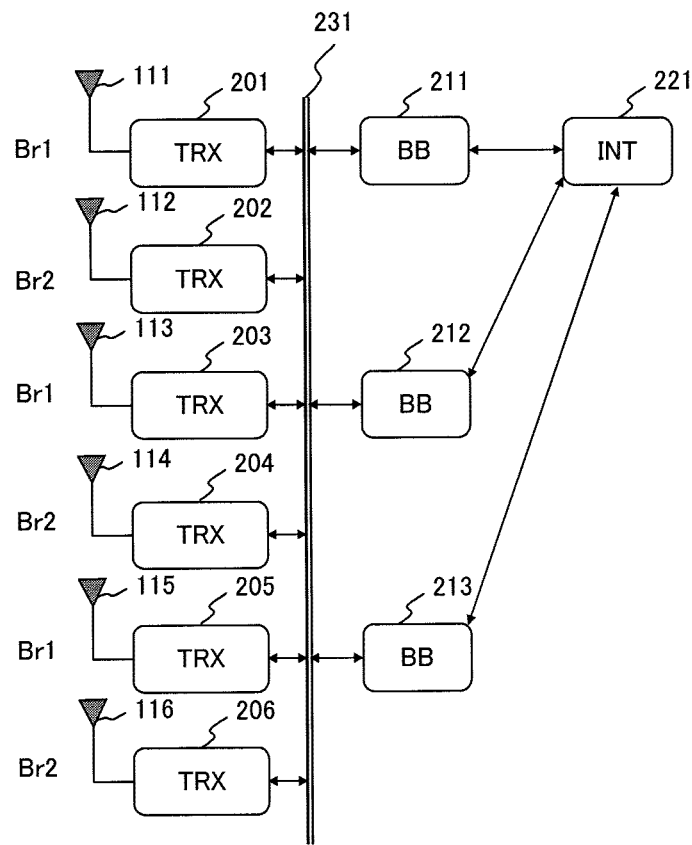
FIG. 2 illustrates the configuration of the conventional base station apparatus.
Figure 3:
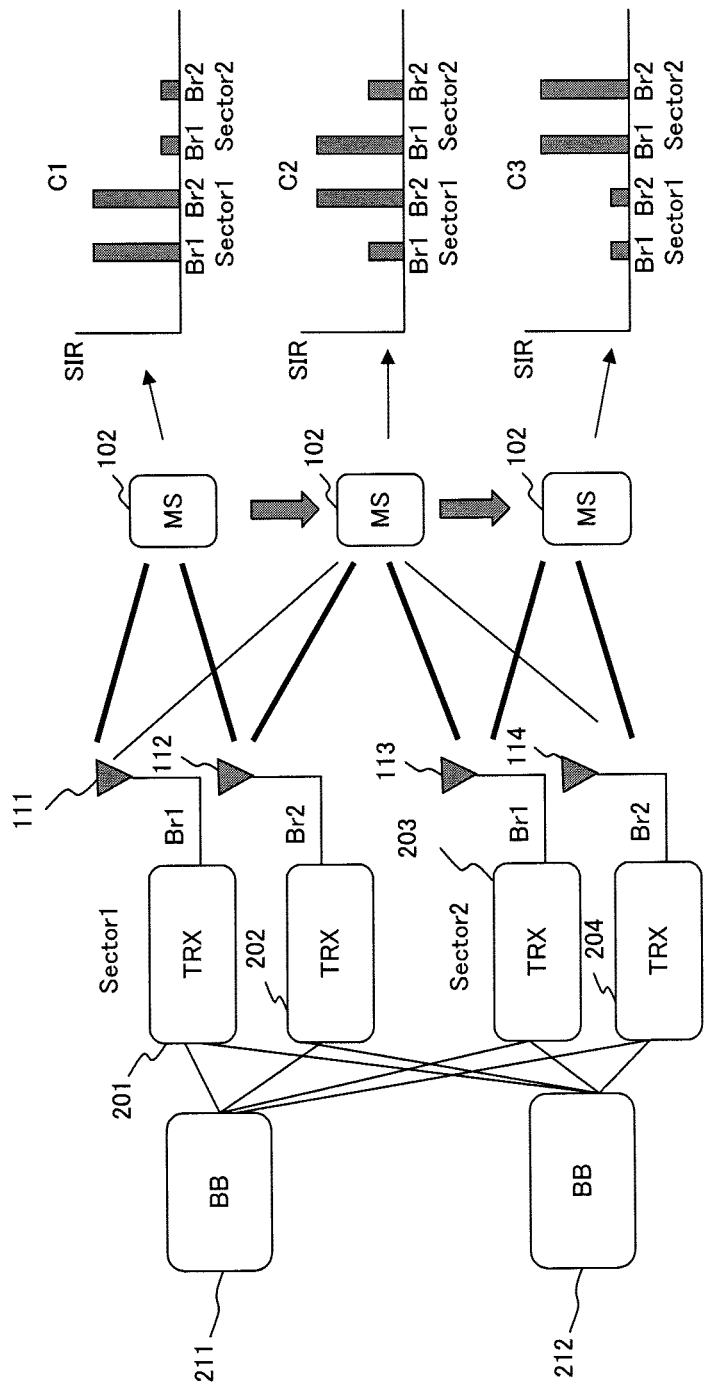
FIG. 3 illustrates the SIR in the conventional MIMO transmission system.
Figure 4:
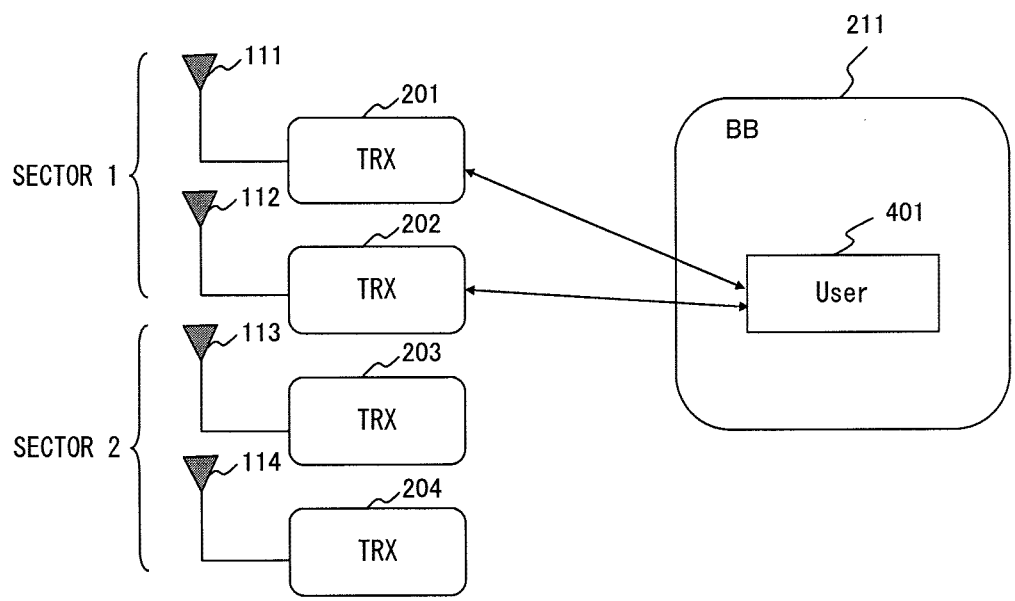
FIG. 4 illustrates the state before handover.
Figure 5:
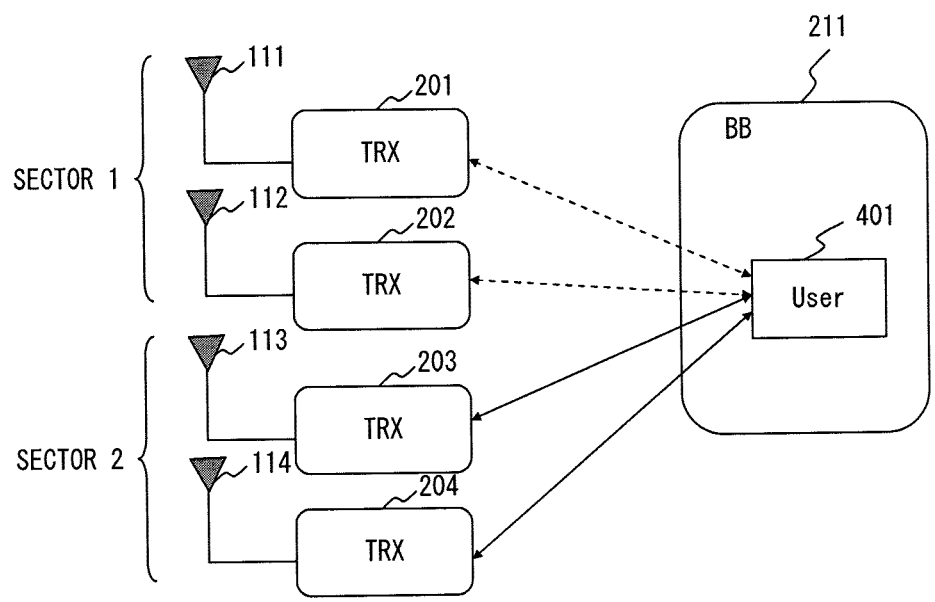
FIG. 5 illustrates the first handover.
Figure 7:
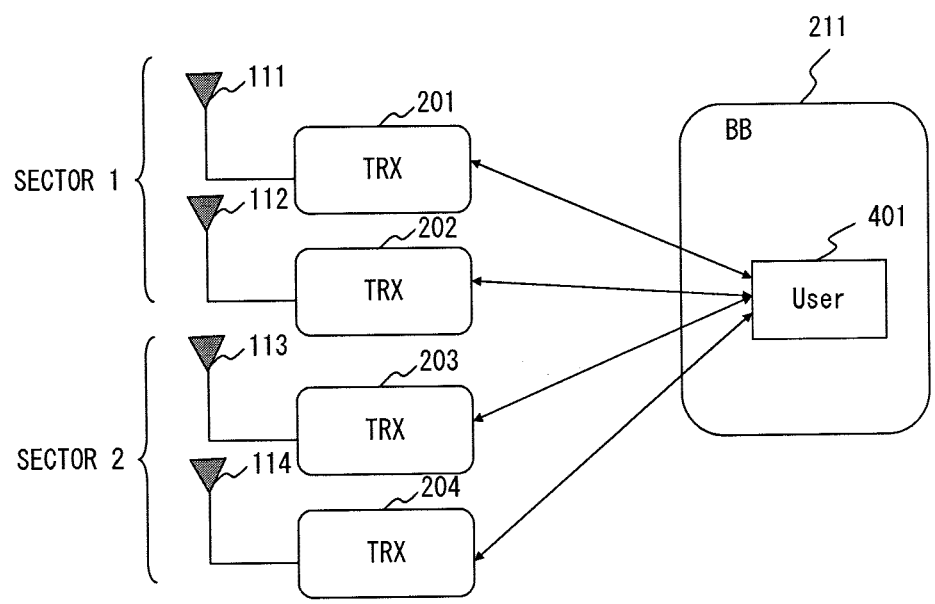
FIG. 7 illustrates a fast cell selection.
Figure 8:
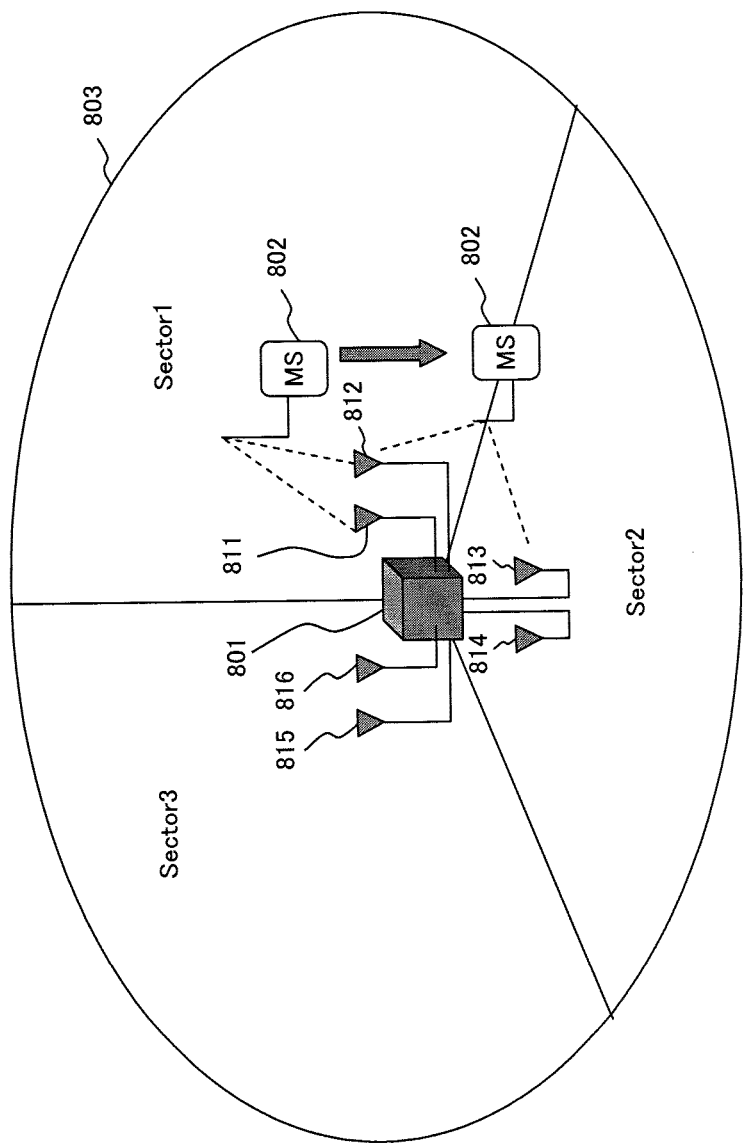
FIG. 8 illustrates the configuration of the first MIMO transmission system.

FIG. 8 illustrates an example of the configuration (2×2 MIMO) of the MIMO transmission system according to the present invention. A cell 803 managed by a base station apparatus 801 is formed by three sectors 1 through 3 as illustrated in FIG. 1, and the base station apparatus 801 has the configuration as illustrated in FIG. 9.

Figure 9:
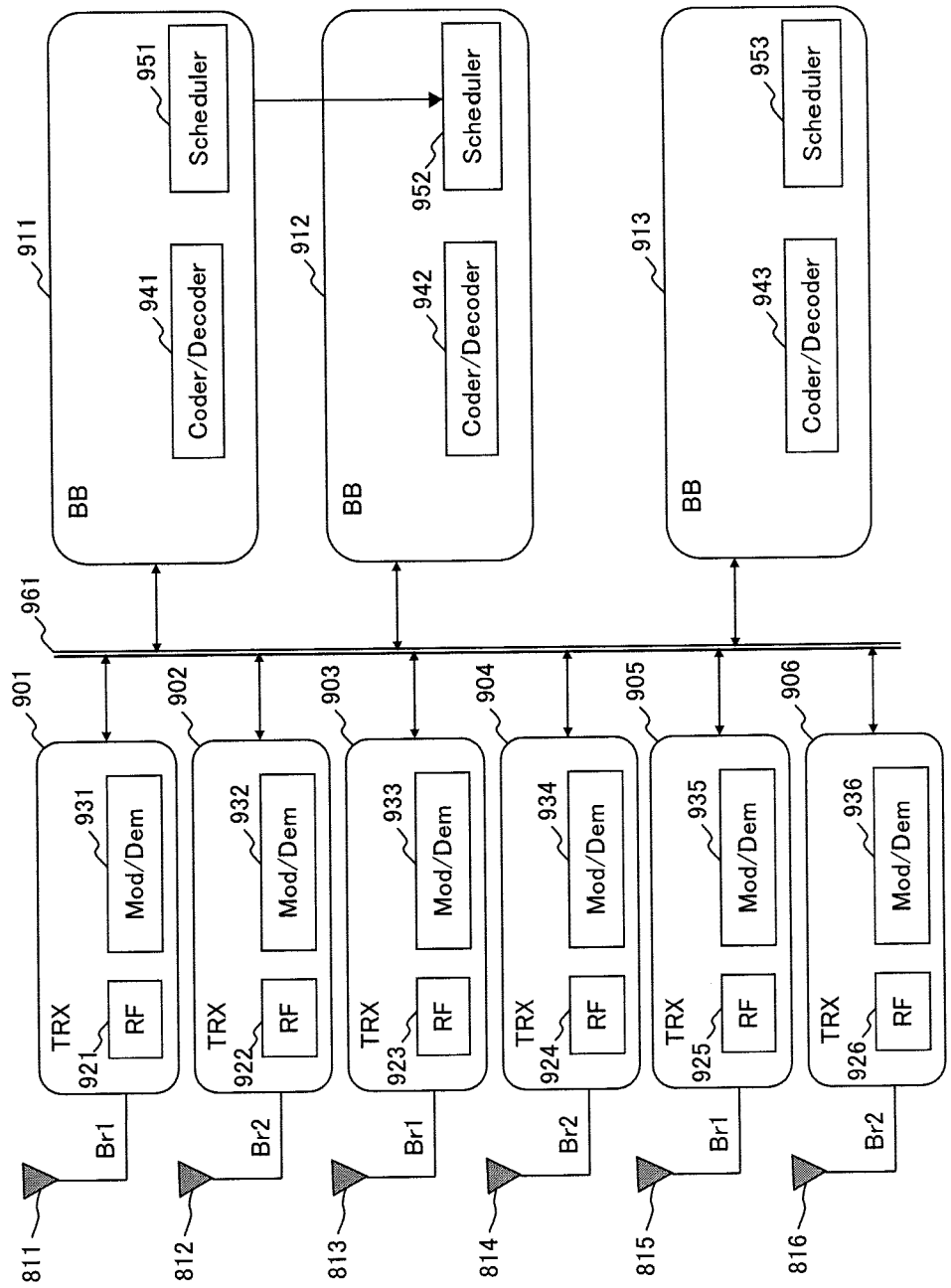
FIG. 9 illustrates the configuration of the first base station apparatus.

The base station apparatus illustrated in FIG. 9 is provided with antennas 811 through 816, transmission/reception units (TRXs) 901 through 906, and baseband processing units (BBs) 911 through 913. Among them, the transmission/reception units 901 through 906 and the baseband processing units 911 through 913 are interconnected to one another via a bus 961. The bus 961 can be replaced with a mesh connection.

Each branch of the sectors 1 through 3 is configured by the combination of the following antennas and transmission/reception units.

1. branch Br1 of sector 1: antenna 811 and transmission/reception unit 901
2. branch Br2 of sector 1: antenna 812 and transmission/reception unit 902
3. branch Br1 of sector 2: antenna 813 and transmission/reception unit 903
4. branch Br2 of sector 2: antenna 814 and transmission/reception unit 904
5. branch Br1 of sector 3: antenna 815 and transmission/reception unit 905
6. branch Br2 of sector 3: antenna 816 and transmission/reception unit 906

The transmission/reception units 901 through 906 perform the signal processing for each antenna (for each branch) The transmission/reception unit 901 includes a radio unit (RF) 921 and a modulation/demodulation unit (Mod/Dem) 931. Similarly, the transmission/reception units 902 and 906 respectively include radio units 922 through 926 and modulation/demodulation units 932 through 936.

The baseband processing units 911 through 913 perform the signal processing for each user. The baseband processing unit 911 includes a coder/decoder 941 and the scheduler 951. Similarly, the baseband processing units 912 and 913 respectively include the coder/decoder 941 and 942, and schedulers 952 and 953.

Schedulers 951 through 953 are implemented using, for example, a CPU (central processing unit) and a memory and select an antenna, a modulation system, etc. for the MIMO transmission by performing scheduling control according to the quality information about a signal transmitted/received through the antennas 811 through 816.

With the above-mentioned configuration, the baseband processing unit processing user data can be connected to any antenna of any sector although a mobile station 802 moves.

In FIG. 9, since a transmission system using a shared channel without CDMA (code division multiple access) is considered, a modulation/demodulation unit is provided in a transmission/reception unit. On the other hand, a modulation/demodulation unit can be provided in the baseband processing unit in the transmission system etc. using the CDMA.

Figure 10:
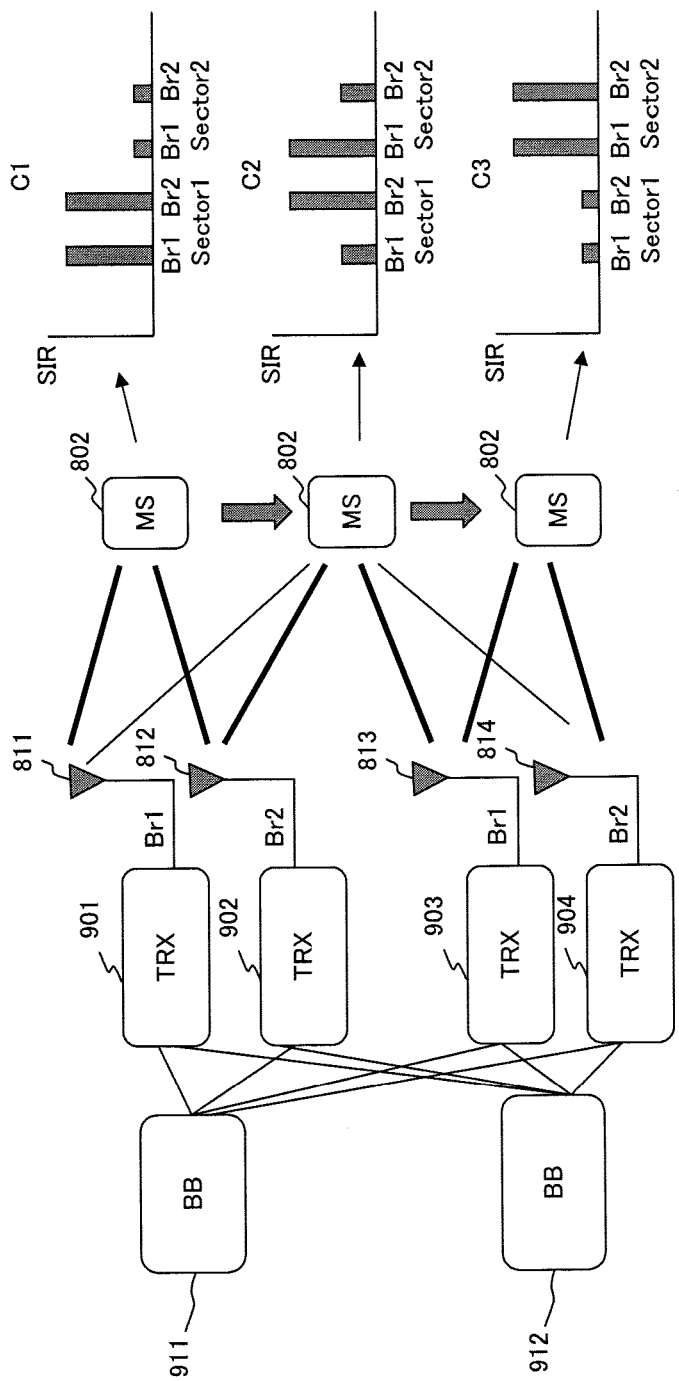
FIG. 10 illustrates the SIR in the first MIMO transmission system.
Figure 11:
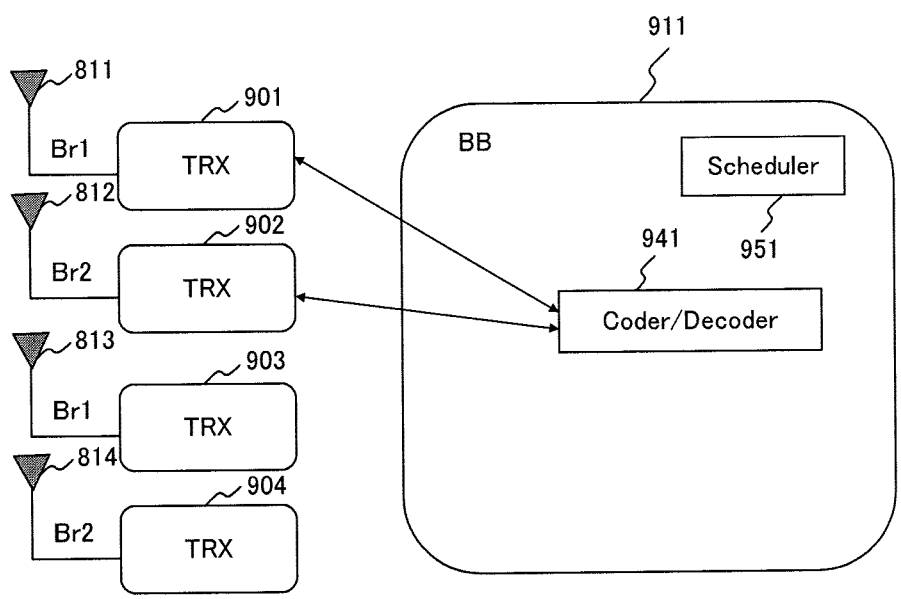
FIG. 11 illustrates the first MIMO transmission.

In FIG. 8, when the mobile station 802 is located around the center of the sector 1, the SIRs of the branches Br1 and Br2 of the sector 1 are large as illustrated for the case C1 in FIG. 10, thereby performing a 2×2 MIMO transmission using the antennas 811 and 812. In this case, as illustrated in FIG. 11, the coder/decoder 941 of the baseband processing unit 911 is connected to the transmission/reception units 901 and 902, and codes/decodes user data.

Next, when the mobile station 802 moves in the vicinity of the boundary between the sectors 1 and 2, the SIRs of the branch Br2 of the sector 1 and the branch Br1 of the sector 2 are large as illustrated for the case C2. Therefore, the 2×2 MIMO transmission is performed using the antennas 812 and 813. In this case, as illustrated in FIG. 12, the coder/decoder 941 of the baseband processing unit 911 is connected to the transmission/reception units 902 and 903, and codes/decodes user data.

Next, when the mobile station 802 moves in the vicinity of the center of the sector 2, the SIRs of the branches Br1 and Br2 of the sector 2 are large as illustrated for the case C3. Therefore, the 2×2 MIMO transmission is performed using the antennas 813 and 814.

Thus, the MIMO transmission can be performed at the maximum transmission rate at the sector boundary by removing the signal processing assigned to a sector and flexibly selecting antennas used in the MIMO transmission. Therefore, depending on the connection state of the mobile station 802, the FCS or the MIMO transmission can be selected in the downlink, or the SHO (including the number of selected sectors) or the MIMO transmission can be selected in the uplink.

As illustrated in FIGS. 11 and 12, the baseband processing unit for processing user data is not changed although the mobile station 802 moves. Therefore, any problem such as an instant disconnection etc. does not occur.

In the conventional system illustrated in FIG. 1, there can be the case in which the MIMO transmission cannot be performed at the sector boundary, and there is an area in which the MIMO transmission cannot be applied in a cell. However, in the system illustrated in FIG. 8, the MIMO transmission can be performed at the sector boundary, and the area where the MIMO transmission can be performed in a cell increases. By adopting a connection configuration and a scheduler capable of selecting the MIMO/FCS/SHO, the MIMO transmission can be selected at the sector boundary around the base station, and the FCS/SHO can be selected at the sector boundary of a cell edge. Thus, appropriate control can be performed depending on the environment in a cell.

Next, the scheduling control in the base station apparatus 801 is described below with reference to FIGS. 13 through 17.

Figure 13:
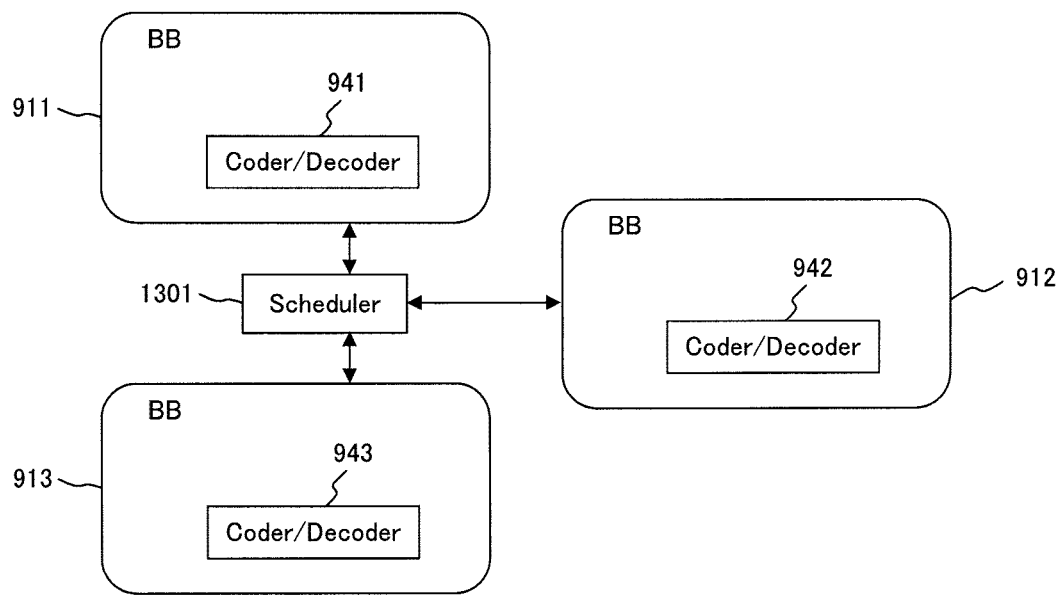
FIG. 13 illustrates a centralized scheduler.

The configuration of the scheduling control can be the distributed system of implementing the schedulers 951 through 953 respectively for the baseband processing units 911 through 913 as illustrated in FIG. 9, and the centralized system of implementing the scheduler 1301 separate from the baseband processing units 911 through 913 as illustrated in FIG. 13.

In the distributed configuration, the assignment of all branches in the base station apparatus 801 is managed as distributed for each baseband processing unit. The managing method can be a method of restricting the number of branches managed for each baseband processing unit, a method of providing a master scheduler in any of the baseband processing units, etc.

In the centralized configuration, the assignment of all branches in the base station apparatus 801 is managed by the scheduler 1301. Since the assignment status of all branches is managed by the scheduler 1301, the assignment of a destination branch can be performed at a high speed.

FIG. 14 illustrates an example of scheduling control in the distributed configuration. In this example, the scheduler 951 of the baseband processing unit 911 for managing mainly the sector 1 manages the mobile station 802 in communications, and the resource (the branches Br1 and Br2 of the sector 1) in communications with the mobile station 802 is assigned to the baseband processing unit 911.

In the downlink, a signal (pilot signal) of a shared channel is constantly transmitted from each antenna of each sector. The mobile station 802 receives these signals and recognizes to which base station and sector it belongs, observes the reception status of the signal of each branch, and collects the CQI (channel quality indicator) information indicating the reception status. The CQI information can be, for example, an SIR, a Doppler frequency, a delay spread, etc.

When the mobile station 802 is connected, the CQI information is included in the uplink signal and fed back to the base station apparatus 801. The scheduler 951 of the base station apparatus 801 that has received the fed back information first recognizes the reception status of the mobile station 802, and then selects the sector, an antenna, and a transmitting method (MIMO, FCS, modulation system, coding rate, etc.) to be used in the transmission in the downlink. The factors for determining these selection items can be the amount of down transmission, the number of users in the sector, etc.

Generally, when the MIMO transmission is applied, a certain level of SIR is required. If the SIR does not reach a predetermined value, it can be advantageous that the FCS is selected with an error rate and the frequency of retransmissions taken into account. If a high-speed transmission is requested in the downlink, and there are two or more antennas having an SIR equal to or exceeding a threshold x (a relatively higher quality) as illustrated in the case C2, the scheduler 951 selects the MIMO transmission. On the other hand, if the SIR is equal to or exceeds a threshold y and does not reach the threshold x as illustrated for the case C4, it selects the FCS.

When the antenna of the sector 2 is used in a determined transmitting method, it is necessary to confirm the resource assignment state of the sector 2. Therefore, a control signal about scheduling is transmitted/received between the schedulers 951 and 952. Then, after the resource assignment and the adjustment of the transmission timing are completed between the schedulers, the MIMO transmission is started.

Figure 15:
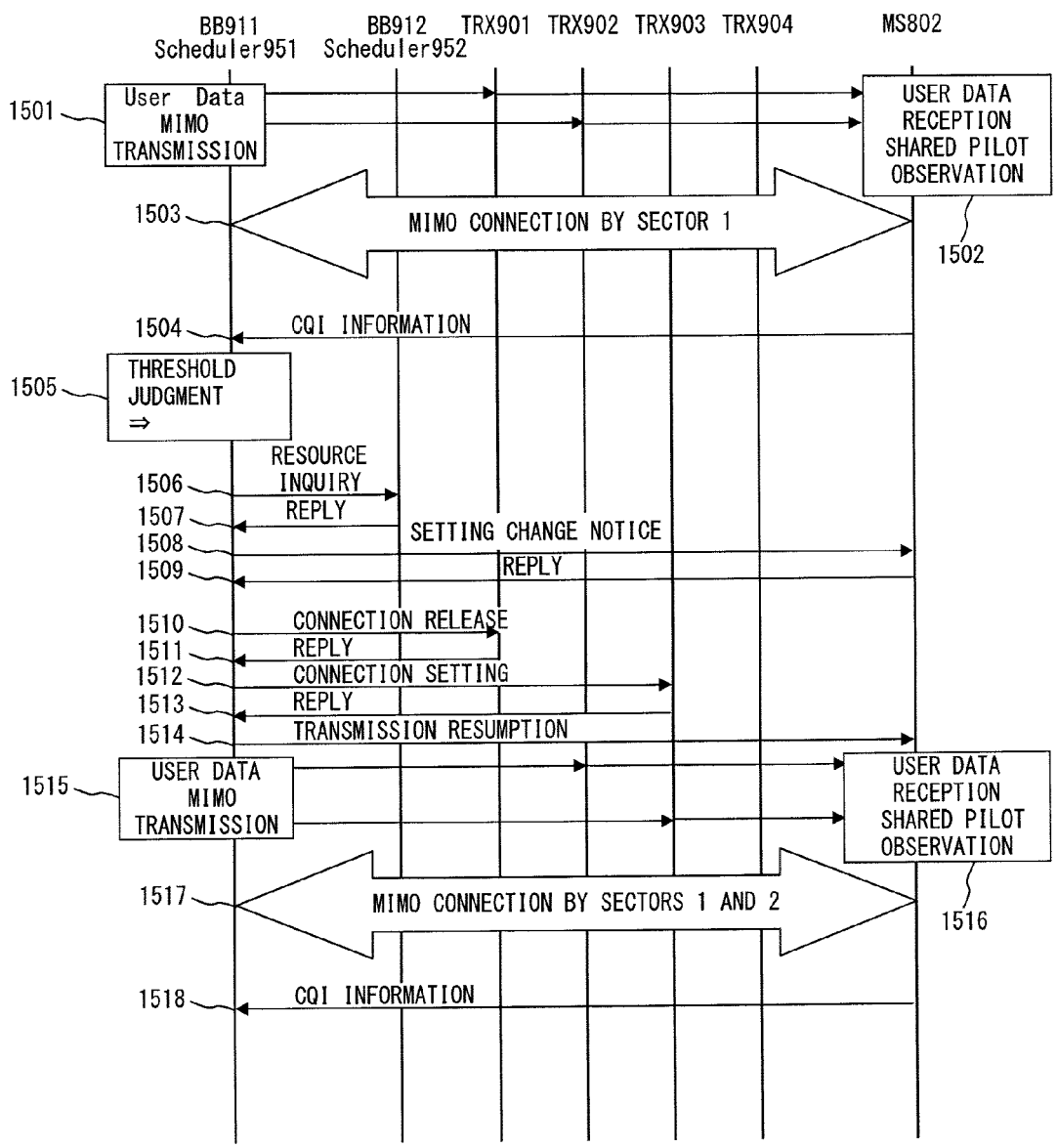
FIG. 15 illustrates the first scheduling control sequence.

FIG. 15 illustrates the sequence of the scheduling control. First, the baseband processing unit 911 MIMO transmits user data to the mobile station 802 through the transmission/reception units 901 and 902 of the sector 1 (step 1501), and the mobile station 802 receives the user data and a pilot signal (step 1502).

Afterwards, the MIMO transmission is continued between the baseband processing unit 911 and the mobile station 802 through the transmission/reception units 901 and 902 of the sector 1 (step 1503). In the meantime, as illustrated for the case C1 in FIG. 16, the SIRs of the branches Br1 and Br2 of the sector 1 exceed the threshold x. The mobile station 802 transmits the SIR, a Doppler frequency, and a delay spread of each branch of each sector as the CQI information to the baseband processing unit 911 (step 1504).

Next, the scheduler 951 of the baseband processing unit 911 performs a threshold judgment for the SIR contained in the received CQI information (step 1505). In this example, as illustrated for the case C2 in FIG. 16, it is recognized that the SIRs of the branch Br1 of the sector 1 and the branch Br2 of the sector 2 do not reach the threshold x, and the SIRs of the branch Br2 of the sector 1 and the branch Br1 of the sector 2 exceed the threshold x.

Then, the MIMO transmission using the branch Br2 of the sector 1 and the branch Br1 of the sector 2 is selected, and the resource assignment status of the sector 2 is inquired of the scheduler 952 of the baseband processing unit 912 (step 1506). Then, the scheduler 952 returns a reply message that there is available resource in the branch Br1 of the sector 2 (step 1507).

Next, the scheduler 951 transmits a setting change notice message to the mobile station 802, and notifies the station that the antenna is to be changed after the transmission of a predetermined number of frames (step 1508). Then, the mobile station 802 returns a reply message (step 1509).

Next, the scheduler 951 transmits a connection release message to the transmission/reception unit 901 (step 1510), and the transmission/reception unit 901 returns a reply message (step 511). The scheduler 951 transmits a connection setting message to the transmission/reception unit 903 (step 1512), and the transmission/reception unit 903 returns a reply message (step 1513).

Next, the scheduler 951 transmits a transmission resumption message to the mobile station 802 (step 1514). The baseband processing unit 911 MIMO transmits user data to the mobile station 802 through the transmission/reception unit 902 of the sector 1 and the transmission/reception unit 903 of the sector 2 (step 1515), and the mobile station 802 receives the user data and a pilot signal (step 1516).

Afterwards, the MIMO transmission is continued between the baseband processing unit 911 and the mobile station 802 through the transmission/reception unit 902 of the sector 1 and the transmission/reception unit 903 of the sector 2 (step 1517). Then, the mobile station 802 transmits the CQI information about each branch of each sector to the baseband processing unit 911 (step 1518).

If the mobile station 802 further moves and enters the state as illustrated for the case C3 in FIG. 16, then the MIMO transmission is performed between the baseband processing unit 911 and the mobile station 802 through the transmission/reception units 903 and 904 of the sector 2.

A radio propagation environment constantly changes by the moving speed of the mobile station 802 and the influence of a multipath system by the reflecting object in the vicinity. The moving speed can be estimated by the mobile station 802 measuring the Doppler frequency. The influence of the multipath system can be digitized by obtaining the delay spread.

The delay spread refers to a standard deviation of a power delay profile indicating the spread of the power distribution with respect to the delay time. When the power delay profile of the reception wave (direct wave or delay wave) at time $\tau$ is represented by a function $p(\tau)$, the delay spread $T_m$ is obtained by the following equation.

$$T_m = \sqrt{E[\tau^2] - E^2[\tau]} \tag{1}$$

$$E[\tau^2] = \frac{\sum \tau^2 \cdot p(\tau)}{\sum p(\tau)} \tag{2}$$

$$E[\tau] = \frac{\sum \tau \cdot p(\tau)}{\sum p(\tau)} \tag{3}$$

where the summation symbols in the equations (2) and (3) indicate the summation with respect to a direct wave and a plurality of delay waves.

The scheduler 951 changes the threshold of the SIR using a Doppler frequency and/or a delay spread included in the received CQI information as necessary in step 1505 to consider the influence of the moving speed and the multi-pass system.

If the SIRs of the branch Br2 of the sector 1 and the branch Br1 of the sector 2 are SIR12 and SIR21 respectively, a normal antenna selection logic is defined as follows.

1. SIR12≥x, SIR21≥x
   →MIMO, branch Br2 of sector 1 and branch Br1 of sector 2
2. SIR12≥x, x>SIR21≥y
   →downlink: FCS, branch Br2 of sector 1 or branch Br1 of sector 2
   uplink: SHO, branch Br2 of sector 1 or branch Br1 of sector 2
3. x>SIR12≥y, SIR21≥x
   →downlink: FCS, branch Br2 of sector 1 or branch Br1 of sector 2
   uplink: SHO, branch Br2 of sector 1 or branch Br1 of sector 2
4. x>SIR12≥y, x>SIR21≥y
   →downlink: FCS, branch Br2 of sector 1 or branch Br1 of sector 2
   uplink: SHO, branch Br2 of sector 1 or branch Br1 of sector 2
5. x>SIR12≥y, y>SIR21
   →branch Br2 of sector 1
6. y>SIR12, x>SIR21≥y
   →branch Br1 of sector 2
7. y>SIR12, y>SIR21
   →transmission disabled On the other hand, when the Doppler frequency fd and the delay spread $\sigma$ are considered, the thresholds x and y are adjusted by the following equations, and an antenna is selected on the basis of the above-mentioned logic using the adjusted thresholds x' and y'.

$$x' = x + \alpha + \beta \tag{4}$$

$$y' = y + \alpha + \beta \tag{5}$$

"$\alpha$" in the equations (4) and (5) is a parameter set depending on the value of the delay spread $\sigma$ and "$\beta$" is a parameter set depending on the value of the Doppler frequency fd. The correspondence between $\sigma$ and $\alpha$ and the correspondence between fd and $\beta$ are assigned in, for example, a table format to the scheduler 951.

In this example, an antenna is selected on the basis of the SIR of each branch, but it is also possible to select an antenna on the basis of other quality information indicating the quality of a signal of each branch. In this case, other quality information is transmitted as the CQI information from the mobile station 802.

In addition, with the configuration illustrated in FIGS. 8 and 9, a cell is divided into three sectors, and two branches are provided for each sector. However, generally, it is possible to divide a cell into two or more sectors, and provide N (N≥2) branches for each sector. In this case, at the sector boundary, one or more antennas belonging to each sector are selected to perform the MIMO transmission.

Figure 18:
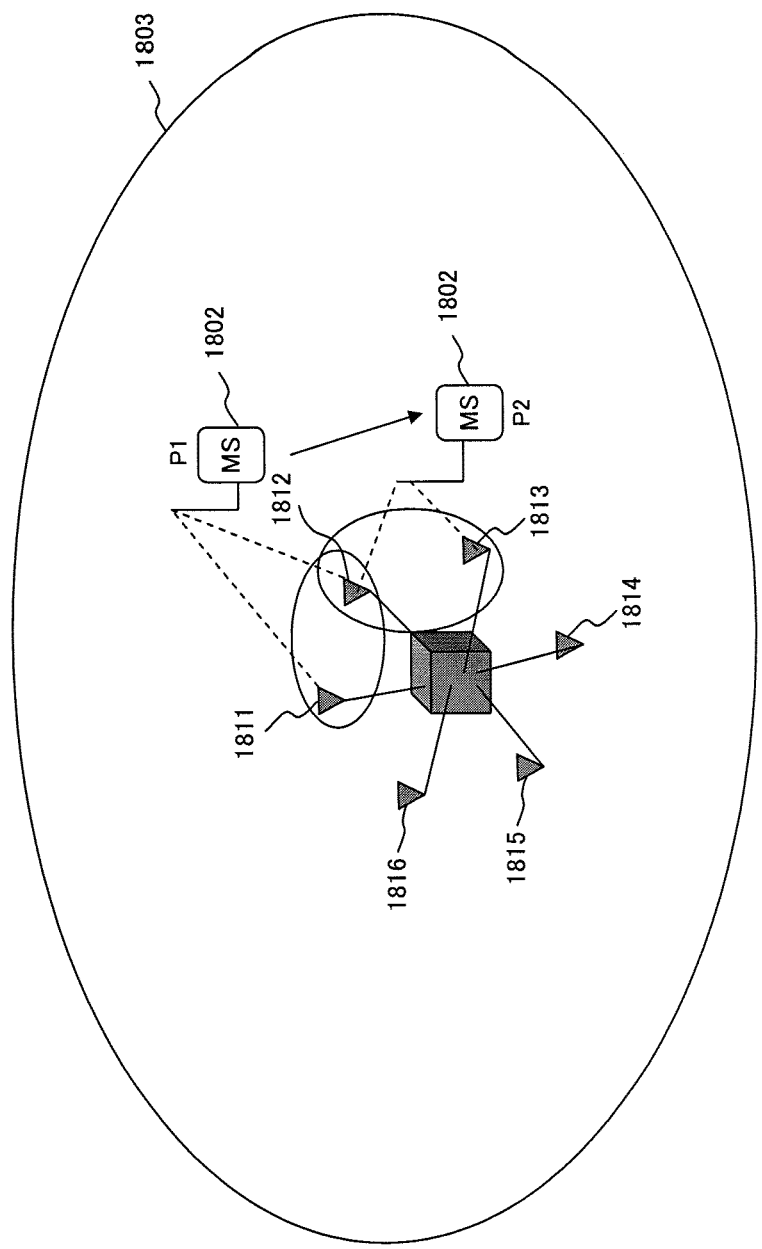
FIG. 18 illustrates the configuration of the second MIMO transmission system.

In the MIMO transmission system illustrated in FIG. 8, a cell in a sector configuration is assumed, but a MIMO transmission system without the concept of the sector configuration can be considered as illustrated in FIG. 18. In this case, a cell 1803 managed by a base station apparatus 1801 is not divided into sectors, and the scheduling control is performed not in units of sector, but antenna. The base station apparatus 1801 has the configuration as illustrated in FIG. 19.

Figure 19:
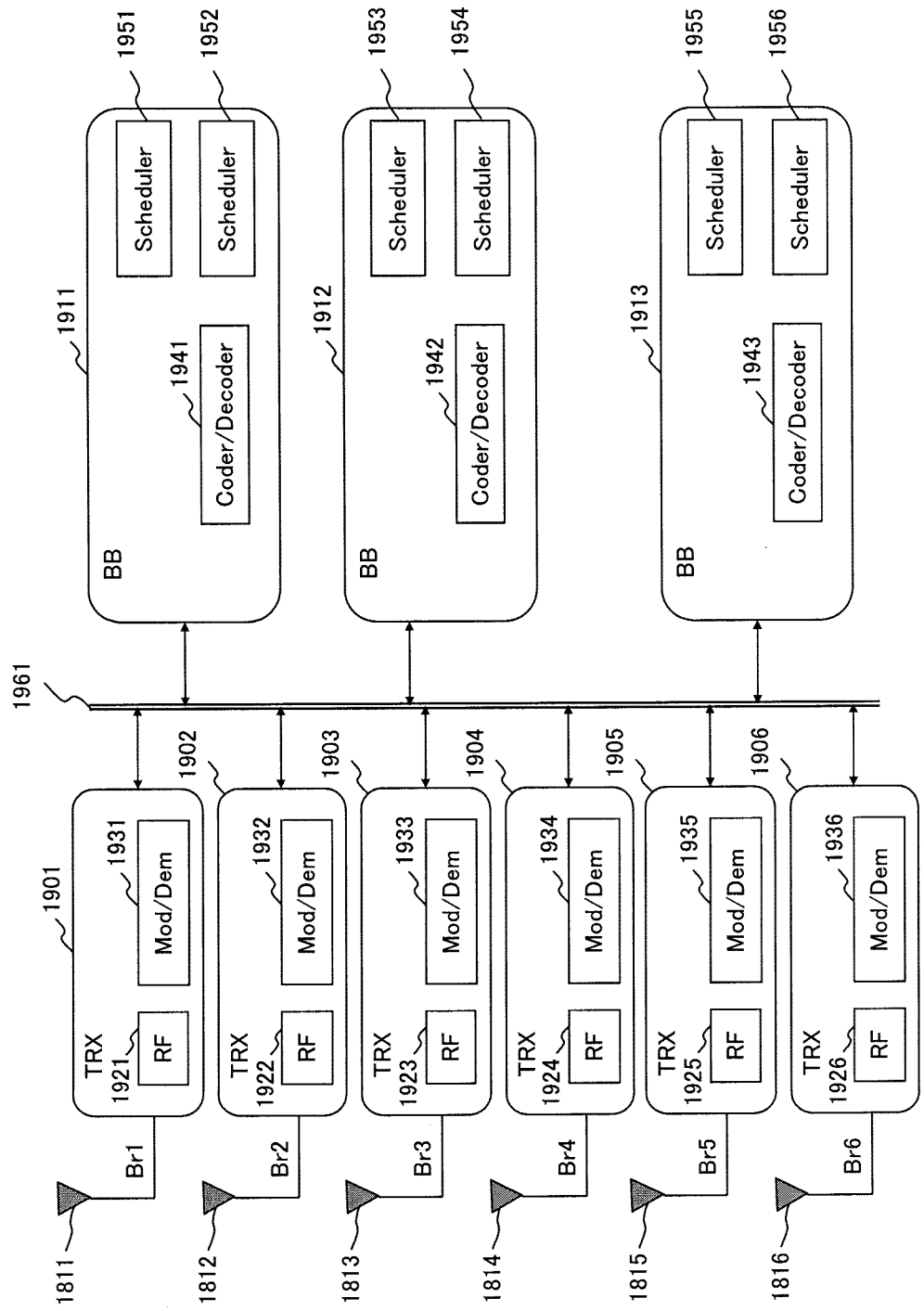
FIG. 19 illustrates the configuration of the second base station apparatus.

The base station apparatus illustrated in FIG. 19 is provided with antennas 1811 through 1816, transmission/reception units (TRXs) 1901 through 1906, and baseband processing units (BBs) 1911 through 1913. Among them, the transmission/reception units 1901 through 1906 and the baseband processing units 1911 through 1913 are interconnected via a bus 1961. The bus 1961 can be replaced with a mesh connection.

Each branch is configured by a combination of the following antennas and transmission/reception units.
1. branch Br1: antenna 1811 and transmission/reception unit 1901
2. branch Br2: antenna 1812 and transmission/reception unit 1902
3. branch Br3: antenna 1813 and transmission/reception unit 1903
4. branch Br4: antenna 1814 and transmission/reception unit 1904
5. branch Br5: antenna 1815 and transmission/reception unit 1905
6. branch Br6: antenna 1816 and transmission/reception unit 1906

The transmission/reception units 1901 through 1906 perform signal processing for each antenna (for each branch). The transmission/reception unit 1901 includes a radio unit (RF) 1921 and a modulation/demodulation unit (Mod/Dem) 1931. Similarly, the transmission/reception units 1902 through 1906 respectively include radio units 1922 through 1926 and modulation/demodulation units 1932 through 1936.

The baseband processing units 1911 through 1913 perform the signal processing for each user. The baseband processing unit 1911 includes a coder/decoder 1941 and schedulers 1951 and 1952. Similarly, the baseband processing unit 1912 includes a coder/decoder 1942 and schedulers 1953 and 1954, and the baseband processing unit 1913 includes a coder/decoder 1943 and schedulers 1955 and 1956.

The schedulers 1951 through 1956 manage the resources of the branches Br1 through Br6 respectively, and performs the scheduling control for each branch.

Figure 20:
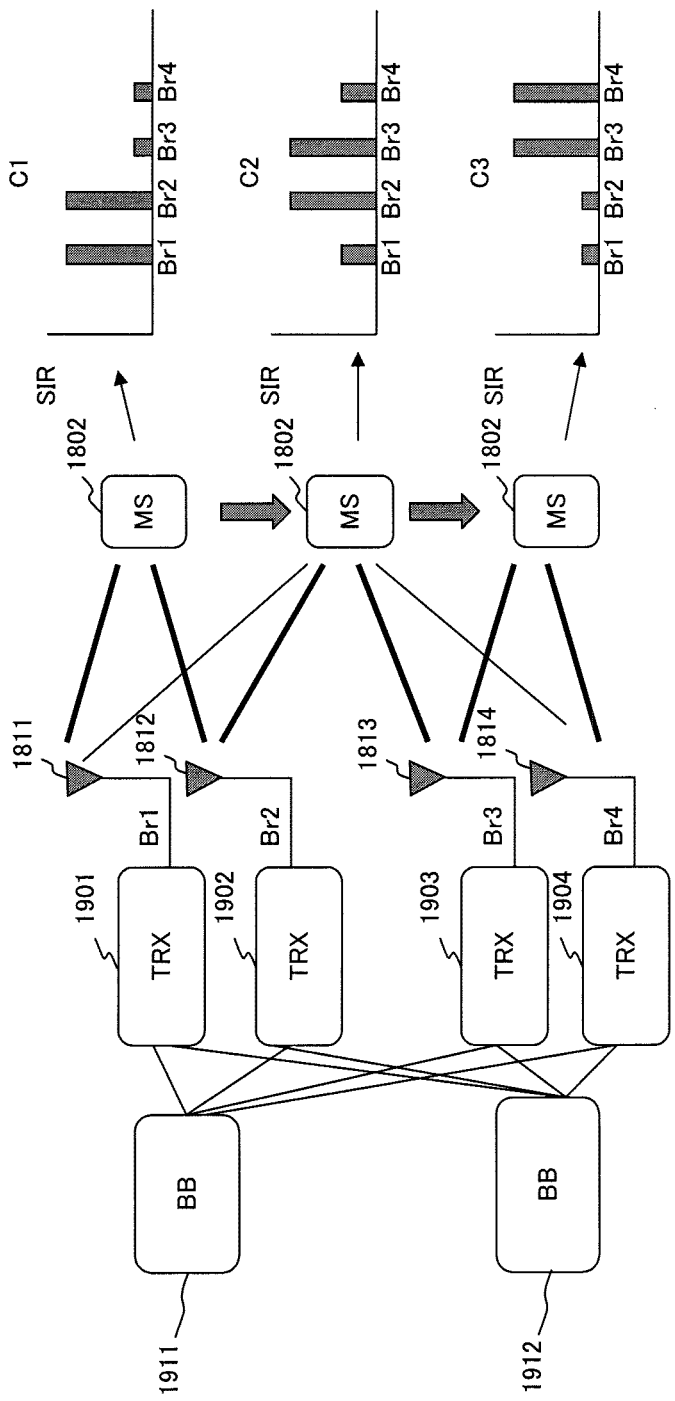
FIG. 20 illustrates the SIR in the second MIMO transmission system.

In FIG. 18, when a mobile station 1802 is located at the position P1, the SIRs of the branches Br1 and Br2 are large as illustrated for the case C1 in FIG. 20. Therefore, the 2×2 MIMO transmission is performed using the antennas 1811 and 1812.

Next, when the mobile station 1802 moves to the position P2, the SIRs of the branches Br2 and Br3 are large as illustrated for the case C2, the 2×2 MIMO transmission is performed using the antennas 1812 and 1813.

Next, when the mobile station 1802 further moves ahead, the SIRs of the branches Br3 and Br4 are large as illustrated for the case C3. Therefore, the 2×2 MIMO transmission is performed using the antennas 1813 and 1814.

With the above-mentioned configuration, since the FCS/SHO are not applied at the sector boundary, the load of the scheduling control is lighter than in the case of the sector configuration.

Figure 21:
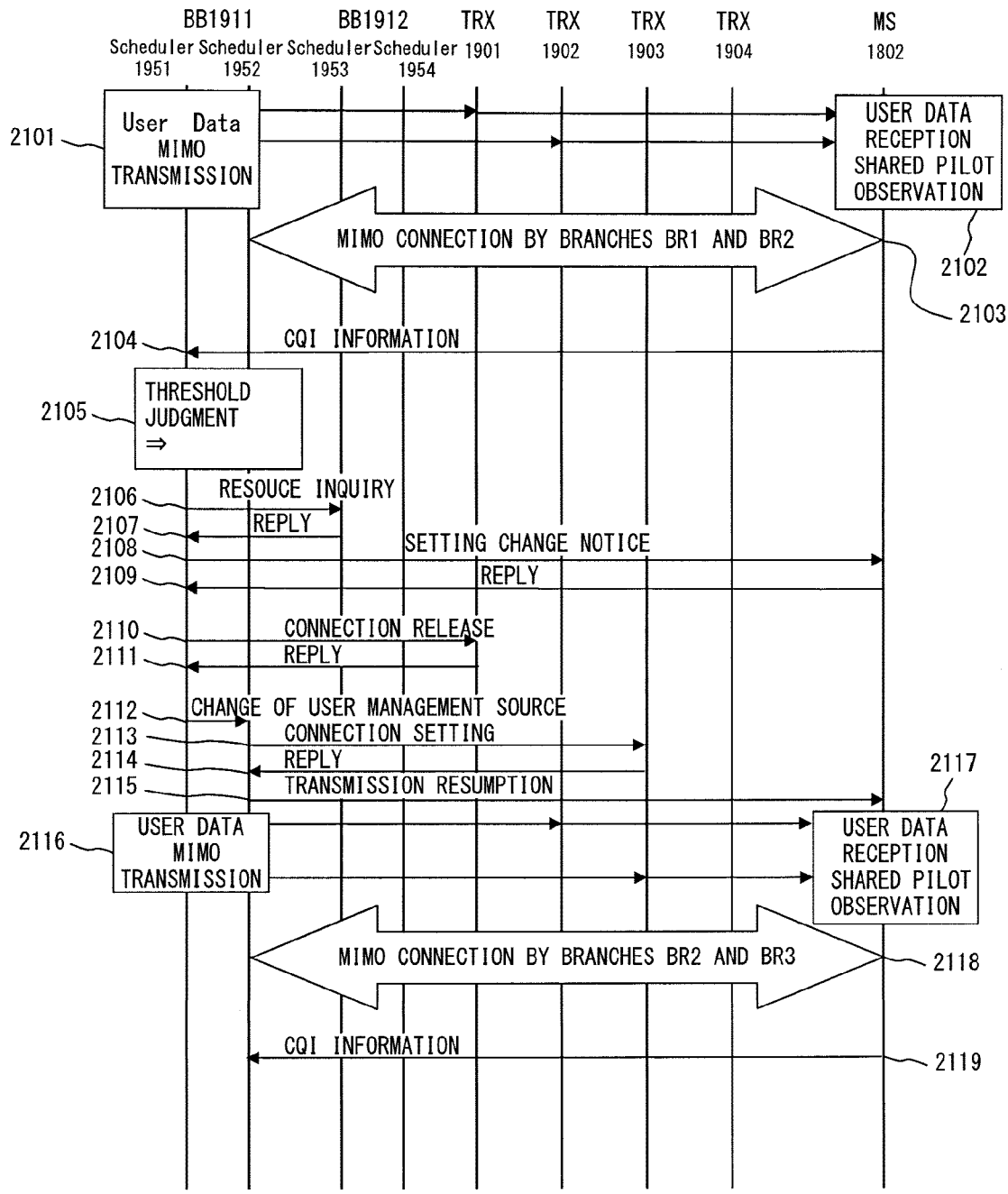
FIG. 21 illustrates the second scheduling control sequence.

FIG. 21 illustrates the sequence of the scheduling control in the system illustrated in FIG. 18. The baseband processing unit 1911 MIMO transmits user data to the mobile station 1802 through the transmission/reception units 1901 and 1902 (step 2101), and the mobile station 1802 receives user data and a pilot signal (step 2102).

Then, the MIMO transmission is continued between the baseband processing unit 1911 and the mobile station 1802 through the transmission/reception units 1901 and 1902 (step 2103). In the meantime, as illustrated for the case C1 in FIG. 22, the SIRs of the branches Br1 and Br2 exceed the threshold x. The mobile station 1802 transmits the CQI information of each branch to the baseband processing unit 1911 (step 2104).

Next, the scheduler 1951 of the baseband processing unit 1911 performs a threshold judgment for the SIR included in the received CQI information (step 2105). In this example, as illustrated for the case C2 in FIG. 22, the SIRs of the branches Br1 and Br4 are smaller than the threshold x, and the SIRs of the branches Br2 and Br3 exceed the threshold x.

The MIMO transmission using the branches Br2 and Br3 is selected, and the resource assignment status of the branch Br3 is inquired of the scheduler 1953 of the baseband processing unit 1912 (step 2106). Then, the scheduler 1953 returns a reply message that there is available resource in the branch Br3 (step 2107).

Next, the scheduler 1951 transmits a setting change notice message similar to the message illustrated in FIG. 15 to the mobile station 1802 (step 2108), and the mobile station 802 returns a reply message (step 2109).

Next, the scheduler 1951 transmits a connection release message to the transmission/reception unit 1901 (step 2110), and the transmission/reception unit 1901 returns a reply message (step 2111). Then, the scheduler 1951 notifies the scheduler 1952 of a change of the management source of the user data from the branch Br1 (scheduler 1951) to the branch Br2 (scheduler 1952) (step 2112).

Next, the scheduler 1952 transmits a connection setting message to the transmission/reception unit 1903 (step 2113), and the transmission/reception unit 1903 returns a reply message (step 2114).

Next, the scheduler 1952 transmits a transmission resumption message to the mobile station 1802 (step 2115). Then, the baseband processing unit 1911 MIMO transmits user data to the mobile station 1802 through the transmission/reception units 1902 and 1903 (step 2116), and the mobile station 1802 receives the user data and a pilot signal (step 2117).

Then, the MIMO transmission is continues between the baseband processing unit 1911 and the mobile station 1802 through the transmission/reception units 1902 and 1903 (step 2118). The mobile station 1802 transmits the CQI information about each branch to the baseband processing unit 1911 (step 2119).

If the mobile station 1802 further moves and enters the state illustrated for the case C3 in FIG. 22, the MIMO transmission is performed between the baseband processing unit 1911 and the mobile station 1802 through the transmission/reception units 1903 and 1904.

In the above-mentioned scheduling control, the number of schedulers is larger than in the case illustrated in FIG. 15. Therefore, the process appears complicated. However, there is a merit that the size of each scheduler can be smaller than that in the case illustrated in FIG. 15, and that one baseband processing unit can be flexibly combined with a plurality of branches. Therefore, it can be considered that a switching operation can be easily performed when the system becomes faulty, and that additional antennas can be easily installed.

If the SIRs of the branches Br2 and Br3 are respectively SIR2 and SIR3, the scheduler 1951 selects an antenna in the following logic in step 2105.

1. $SIR2 \geq x$, $SIR3 \geq x$
   →MIMO, branches Br2 and Br3
2. $SIR2 \geq x$, $x > SIR3 \geq y$
   →branch Br2 or Br3
3. $x > SIR2 \geq y$, $SIR3 \geq x$
   →branch Br2 or Br3
4. $x > SIR2 \geq y$, $x > SIR3 \geq y$
   →branch Br2 or Br3
5. $x > SIR2 \geq y$, $y > SIR3$
   →branch Br2
6. $y > SIR2$, $x > SIR3 \geq y$
   →branch Br3
7. $y > SIR2$, $y > SIR3$
   →transmission disabled The thresholds x and y can also be changed into thresholds x' and y' in the above-mentioned adjusting method. In addition, with the configuration illustrated in FIGS. 18 and 19, six branches are provided. However, N (N≥2) branches can be normally provided. In this case, two or more antennas are selected from among N antennas, thereby performing the MIMO transmission.

What is claimed is:

1. A base station apparatus which performs radio communications in a multiple-input/multiple-output transmission with a mobile station in a cell having a plurality of sectors, the base station apparatus comprising:
   a plurality of antennas provided for each of the plurality of sectors; and
   a controller to compare quality information of a signal received by the mobile station from each of the antennas with a threshold, select a first antenna from among the antennas, provided for a first sector of two sectors, having the quality information exceeding the threshold and a second antenna from among the antennas, provided for a second sector of the two sectors, having the quality information exceeding the threshold when the mobile station moves in a vicinity of a boundary of the two sectors, and select a multiple-input/multiple-output transmission using the selected first and second antennas.

2. The base station apparatus according to claim 1, wherein the controller selects a transmission by a fast cell selection or soft handover unless there is a plurality of antennas having the quality information exceeding the threshold.

3. The base station apparatus according to claim 2, wherein the controller adjusts the threshold according to information about a Doppler frequency or a delay spread of the signal received by the mobile station from each antenna.

4. The base station apparatus according to claim 1, wherein:
   the controller includes a first scheduler to manage the first antenna of the first sector from which the mobile station moves, and a second scheduler to manage the second antenna of the second sector to which the mobile station moves;
   the first scheduler inquires of the second scheduler about whether or not the second antenna of the second sector is available, and selects a multiple-input/multiple-output transmission using the second antenna when the second antenna is available.

5. A base station apparatus which performs radio communications in a multiple-input/multiple-output transmission with a mobile station in a cell having no sector configuration, the base station apparatus comprising:
   a plurality of antennas provided corresponding to the cell having no sector configuration; and
   a controller to compare quality information of a signal received by the mobile station from each antenna with a threshold, select two or more antennas from among the antennas having the quality information exceeding the threshold when the mobile station moves, and select a multiple-input/multiple-output transmission using the selected antennas, wherein:
   the controller comprises a first scheduler to manage an antenna in communications with the mobile station in the plurality of antennas, and a second scheduler to manage a newly selected antenna; and
   the first scheduler inquires of the second scheduler whether or not the newly selected antenna is available, and selects a multiple-input/multiple-output transmission using the newly selected antenna if the newly selected antenna is available.

6. The base station apparatus according to claim 5, wherein the controller adjusts the threshold according to information about a Doppler frequency or a delay spread of the signal received by the mobile station from each antenna.

7. A communication method for performing radio communications in a multiple-input/multiple-output transmission with a mobile station in a cell having a plurality of sectors, the communication method comprising:
   comparing quality information of a signal received by the mobile station from each of a plurality of antennas provided for each of the plurality of sectors with a threshold;
   selecting a first antenna from among the antennas, provided for a first sector of two sectors, having the quality information exceeding the threshold and a second antenna from among the antennas, provided for a second sector of the two sectors, having the quality information exceeding the threshold when a mobile station moves in a vicinity of a boundary of the two sectors; and
   performing a multiple-input/multiple-output transmission using the selected first and second antennas.

* * * * *